(12) United States Patent  (10) Patent No.: US 8,280,838 B2
Ferrucci et al.  (45) Date of Patent: Oct. 2, 2012

(54) EVIDENCE EVALUATION SYSTEM AND METHOD BASED ON QUESTION ANSWERING

(75) Inventors: David A. Ferrucci, Hawthorne, NY (US); Wlodek W. Zadrozny, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 12/561,802

(22) Filed: Sep. 17, 2009

(65) Prior Publication Data

US 2011/0066587 A1 Mar. 17, 2011

(51) Int. Cl.
G06N 5/02 (2006.01)
(52) U.S. Cl. ............................................ 706/54; 706/46
(58) Field of Classification Search ...................... 706/54
See application file for complete search history.

(56) References Cited

U.S. PATENT DOCUMENTS

| | | | |
|---|---|---|---|
| 6,609,087 B1 | 8/2003 | Miller et al. | |
| 6,823,325 B1 | 11/2004 | Davies et al. | |
| 7,081,091 B2 | 7/2006 | Merrett et al. | |
| 7,809,664 B2 * | 10/2010 | Heck ............................... | 706/46 |
| 2004/0122846 A1 | 6/2004 | Chess et al. | |
| 2005/0071217 A1 | 3/2005 | Hoogs et al. | |
| 2005/0086226 A1 | 4/2005 | Krachman | |
| 2005/0154701 A1 | 7/2005 | Parunak et al. | |
| 2006/0218491 A1 | 9/2006 | Grossman et al. | |
| 2006/0287970 A1 | 12/2006 | Chess et al. | |
| 2007/0005520 A1 | 1/2007 | Eick et al. | |
| 2007/0010993 A1 | 1/2007 | Bachenko et al. | |
| 2007/0016464 A1 | 1/2007 | Yen et al. | |
| 2007/0016540 A1 | 1/2007 | Sun et al. | |
| 2007/0067285 A1 | 3/2007 | Blume et al. | |
| 2007/0132767 A1 | 6/2007 | Wright et al. | |
| 2007/0171716 A1 | 7/2007 | Wright et al. | |
| 2007/0198450 A1 | 8/2007 | Khalsa | |
| 2007/0198952 A1 | 8/2007 | Pittenger | |
| 2007/0220137 A1 | 9/2007 | Chess et al. | |
| 2007/0226796 A1 | 9/2007 | Gilbert et al. | |
| 2007/0276723 A1 | 11/2007 | Samid | |
| 2007/0299547 A1 | 12/2007 | Bier | |
| 2007/0299872 A1 | 12/2007 | Bier | |
| 2007/0300170 A1 | 12/2007 | Bier et al. | |
| 2007/0300190 A1 | 12/2007 | Bier et al. | |
| 2008/0109730 A1 | 5/2008 | Coffman et al. | |

OTHER PUBLICATIONS

Wikipedia, Intelligence Analysis, http://en.wikipedia.org/wiki/Intelligence_analysis.

(Continued)

Primary Examiner — Michael B Holmes
(74) Attorney, Agent, or Firm — Scully, Scott, Murphy & Presser, P.C.; Daniel P. Morris, Esq.

(57) ABSTRACT

An evidence evaluation method and system based on question answering converts a report of analyzed information and/or a model of information into a collection of questions, determines answers for the collection of questions. A fact in the report is marked as being supported if one or more of the answers for the collection of questions support the fact. A fact in the report of analyzed facts is marked as being refuted if one or more of the answers for the collection of questions refute the fact. The method and system also may collect the answers as evidence and add the evidence to the model of information to create an updated model of information. The steps may be repeated using the updated report and updated model.

20 Claims, 4 Drawing Sheets

OTHER PUBLICATIONS

Wikipedia, Data Stream Mining, http://en.wikipedia.org/wiki/Data_stream_mining.

Applied Systems Intelligence, Intelligence Analysis Solutions, http://www.asinc.com/intelligence-analysis/.

Precision Computing Intelligence, CrimeLink, http://www.pciusa.us/crimelink.aspx.

CrimeLink, crimelink.aspx.htm.

Heuer, Jr., Psychology of Intelligence Analysis, Center for the Study of Intelligence, Central Intelligence Agency, 1999.

* cited by examiner

EVIDENCE EVALUATION SYSTEM AND METHOD BASED ON QUESTION ANSWERING

BACKGROUND

The present disclosure relates generally to artificial intelligence and intelligence analysis, and more particularly to an evidence evaluation system and method based on question answering.

Intelligence analysts are given an initial collection of documents, and a set of questions and hypotheses, plus access to additional sources. Their task is to answer the question and provide arguments for and against the hypotheses. After some preliminary work, one or more of them begin to work on a document. Currently, intelligence support software is driven by extracted patterns. Current systems rely on extraction of specific patterns, such as "Person-type travel-type from A-location to B-location", which can be viewed as a logical form (LF) of the information of interest. Thus, existing systems classify text strings as to whether they contain such patterns of interest, and if so, the existing systems extract the relations of interest, and put them into relational databases for further processing (e.g. data mining, or querying).

Based on such extract patterns, hypothesis formed in intelligence analysis may be confirmed or refuted. However, given the huge amount of data, it is difficult to know if the absence of evidence against a hypothesis is genuine or simply a failure of search. Further, a disadvantage of such approach is that no systems may do it reliably for unrestricted domains, and even for restricted domains the specification of extraction patterns is costly. The reason is that the same facts can be expressed in many different ways and are not necessarily contained in one or even adjacent sentences. Another disadvantage of such approach may stem from the need to understand in advance what types of questions can be asked by analysts. Thus, for example, a set of patterns can be created to cover travel between locations, but an analyst might in a particular case care about other information during the covered travel, for example, how and where the ticket for travel was bought, or the details about refueling a car or an airplane.

BRIEF SUMMARY

A method and system for evidence evaluation based on question answering are provided. The method in one aspect may include converting information into a collection of questions by a processor and determining answers to the collection of questions. The method may also include marking a fact in the information as being supported if one or more of the answers to the collection of questions support the fact, and marking a fact in the information as being refuted if one or more of the answers to the collection of questions refute the fact. The method may further include collecting evidence that support the answers, and adding the evidence to a model of information to create an updated model of information.

A system for an evidence evaluation based on question answering, in one aspect, may include an editor operable to allow entering of information. An editor plug-in is operable to automatically convert the information into a collection of questions. A question answering processing module is operable to determine answers for the collection of questions. The editor plug-in is further operable to mark a fact in the information as being supported if one or more of the answers for the collection of questions support the fact and marking a fact in the information as being refuted if one or more of the answers for the collection of questions refute the fact. The editor plug-in is further operable to collect the answers as evidence and add the evidence to the model of information to create an updated model of information.

A program storage device readable by a machine, tangibly embodying a program of instructions executable by the machine to perform methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

Figure 1:
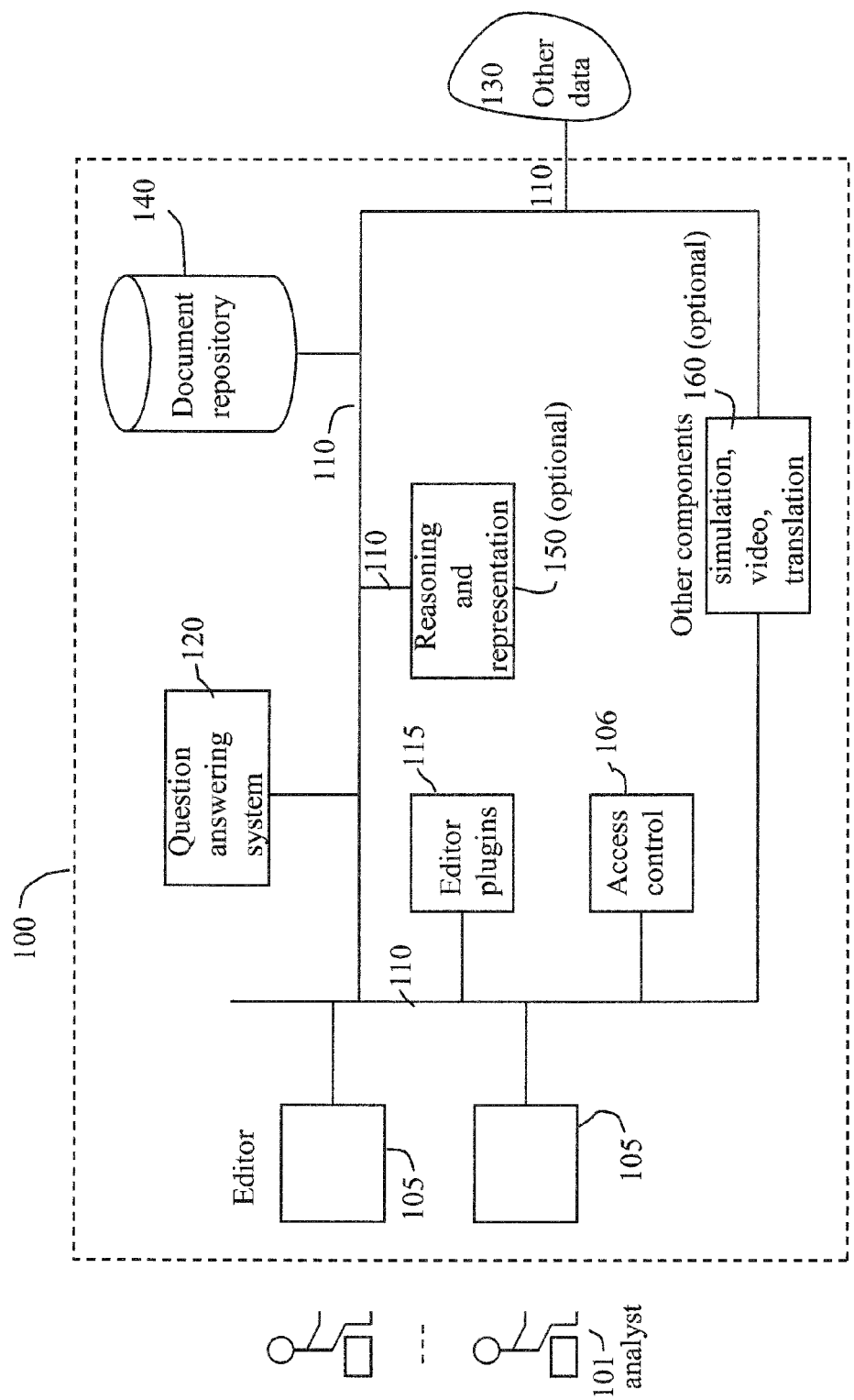
FIG. 1 shows functional components of the system of the present disclosure in one embodiment.

The processes of intelligence or business analysis involve sifting through large amount of data and producing reports and recommendations in a timely manner. In one embodiment, the disclosed system and method check facts in the background as an analysis is being developed. The checking process leverages a question answering system. Unlike prior art, the system and method of the present disclosure in one embodiment do not rely on prior extracted patterns to verify facts.

For example, the system and method of the present disclosure in one embodiment may be driven by competing hypotheses without the need to extract such patterns. In particular, the system and method of the present disclosure in one embodiment does not require translation of textual data into such logical forms (LF), or a discourse model for preprocessing of textual data. Instead, as the analyst develops the analysis, the system and method in one embodiment may continuously seek confirmation and refutation of the assertions in the analysis. The system and method of the present disclosure may look for confirmation (or refutation) of factual assertions without the necessity of producing the LF, and without the need to pre-classify the text strings in the database to determine whether they contain a set of fixed patterns of interest. Since the system and method of the present disclosure does not place restriction on fixed patterns of interest when looking for confirmation or refutation of assertions, the analysis is broadened and is likely to improve the accuracy because the classification is done in the context of a particular set of assertions developed in the report in progress.

However, the system and method of the present disclosure do not preclude using such patterns. Further, preprocessing for patterns may be useful for data mining, alerts, answering questions about relationships, and the like. Rather, the system and method of the present disclosure may utilize methodologies beyond those of patterns strictly.

In one embodiment, the system and method of the present disclosure may use incremental evaluation of evidence, for instance, implicitly factoring in and/or reducing cost. Thus, the effort on building specialized formal representations can be focused, instead of being applied to all data, which would be required for providing extracted patterns.

The system and method of the present disclosure may allow collaboration with other analysts in the process of evidence evaluation, building hypotheses and document writing, and need not rely on the analysts necessarily sharing the same formal model. Most of the work can be driven by the process of writing a report in English (or other natural language) and most of the evidence may be in English or other natural language.

The system and method of the present disclosure may preserve the provenance of hypotheses and models, including the connection to the underlying data. The system can automatically alert the analyst if any of the underlying hypotheses have been invalidated by new data.

As will be explained below, the system and method of the present disclosure may interoperate with most areas of the standard intelligence software model. This model usually includes various forms of data processing (text, images, sensors, etc.), document processing (editing, versioning etc.), and collaboration. The disclosed system and method can be used on metadata and other extracted information represented as text or text-like annotations (e.g. in XML), of data having images, video, sensor data and/or the like.

FIG. 1 illustrates functional components in one embodiment of the system of the present disclosure. It shows how the system communicates with analysts and operations of functional components. An evidence evaluation system 100 may include one or more editors 105 that allow one or more analysts 101 to create models and reports. Editors 105 can be software or the like tools that a user can use to create and edit a computer file. Editors 105 may be collaborative, e.g., multiple analysts may edit a computer file using or from different computers or the like devices. Models are any formal representations of information. Examples of models may include but are not limited to logical formulas, graphs, data structures used for simulation and others. Reports may be written and/or oral presentations, for example, including electrical messages, hardcopy reports, and/or briefings.

A question answering (QA) system or module 120 may include functionalities such as text analysis and search. A QA system automatically answers a question, for instance, posed in natural language. The QA system or module 120 may perform text analysis of the question and find answers by searching a collection of information such as a database or natural language documents, the World Wide Web, or other data and also performing text analysis on the searched data. The QA system 120 retrieves relevant facts with evidence.

Editor plugin(s) 115 allow the interaction of the models and reports created by analysts with the rest of the system 100 and with the QA system 120. For example, editor plugins 115 allow the content that is being edited or modeled to be taken from the editor module 105 and passed to other modules such as 120 (QA) or other components such as those shown at 160. The plugin may take a text and metadata such as a pointer to the document being edited and store the text and/or the metadata. The plugin passes the text and/or the metadata to other modules such as the QA system or module 120, reasoning and representation module 150, and/or other components 160. The editor plugin 115 may receive the output from those modules and as the output is received, the editor plugin 115 may pass the output or results back to the editor module 105. The editor plugin 115 may take the output or results and render the results for presentation to the analyst 101 or the like. For example, the editor plugin 115 may present different color highlights on the text that is not confirmed by data in the search, and possibly as a revision mark or note (e.g., as in Microsoft Word™) explaining the reasons. The editor plugin 115 may perform any function that allows interoperation of the editor 105 with the other modules (e.g., 120, 150, 160). For example, the editor plugin 115 communicates the edited content to those modules (e.g., 120, 150, 160) and passes back the output from those modules (e.g., 120, 150, 160) to the editor 105, for example, as "evidence".

Document repository 140 may contain data, for example, as structured data (databases), and/or semi-structured (e.g. XML) documents. An access control system 106 manages access permissions of different entities, users, applications or the like. For example, the access control system 106 determines whether a user or an application or the like has permission to access one or more components or data, and grants or denies the access. Document repository 140 and other data 130 may be used as a document set for fact extraction.

The system 100 may also include an optional reasoning and representation system or module 150. This module 150 provides for automated computer reasoning, for instance, utilizing artificial intelligence techniques. This module 150 may use logic and make inferences from the data such as the document repository 140, other data 130 and the like. The system 100 may further include other functional components 160 such as simulation video, translation and others. The components 160 may be optionally used to simulate and/or evaluate the model. The model can be a program with data, e.g., compute the consistency of a formal logical model, or the expected length of a car trip from San Diego to San Francisco based on known and average traffic conditions and the like. All the subcomponents of the system 100 may be connected through a network connection or bus 110. Optionally, the system 100 may also connect via a communication link 110 to other data, for example the Internet.

Figure 2:
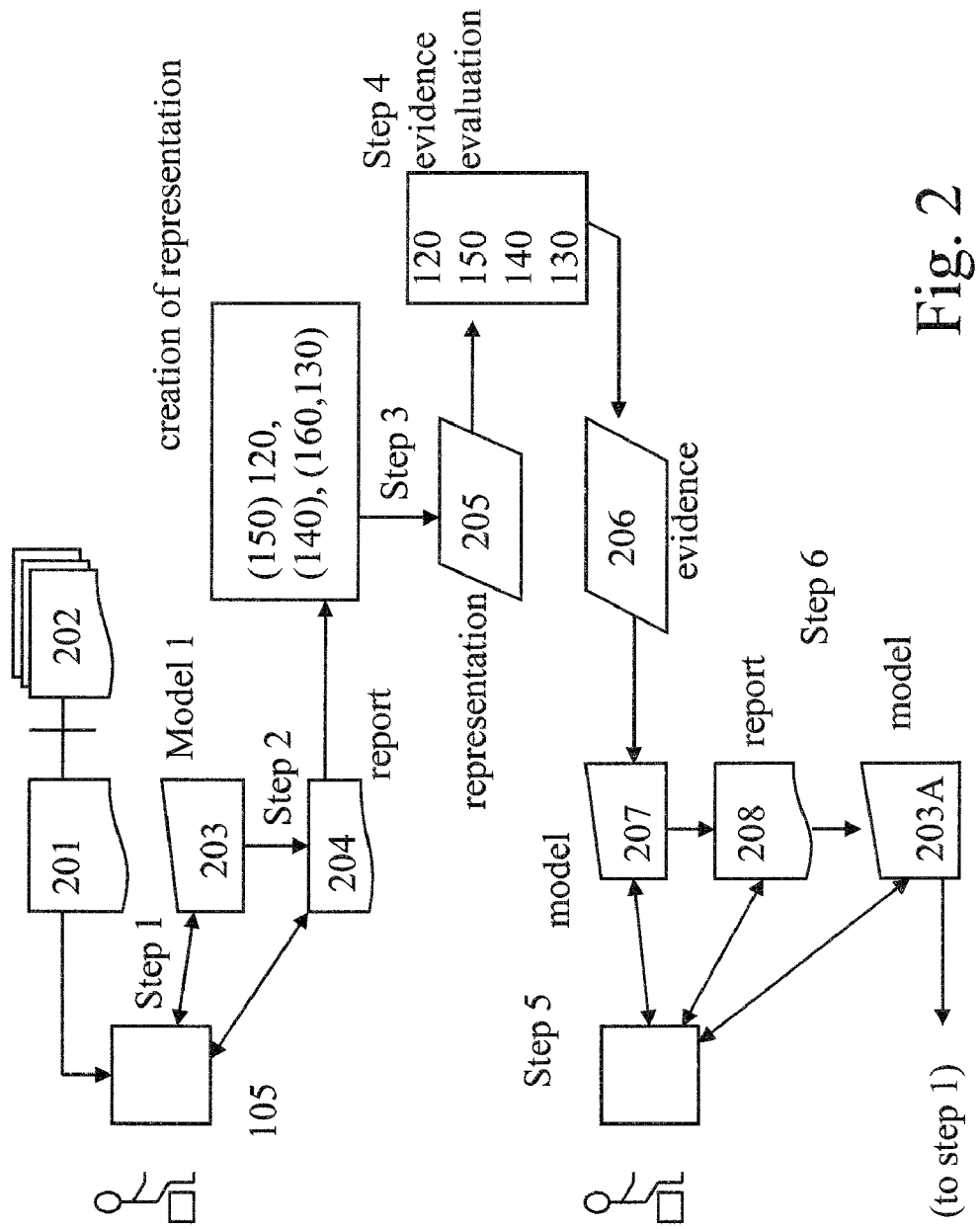
FIG. 2 is a flow diagram illustrating evaluation based method in one embodiment.

FIG. 2 illustrates a method of operation of the evidence evaluation in one embodiment, for example, from the analyst(s) building the initial model and starting the report through evidence evaluation using the system components illustrated in FIG. 1 to the creation of a revised model and a revised report, upon which the next round of evidence evaluation can begin. For ease of explanation, interactive operations between the analyst(s) and the system 100 shown in FIG. 1 are incorporated in the following description. Step 1 may be performed by an analyst. Given, for example, questions to answer and a collection of documents to be used as the basis for forming the answers to the questions, an analyst (or analysts) creates an initial model 203 based on the set of questions 201 and set of documents 202 at step 1. The initial model 203 thus may contain a formal representation of hypotheses and information related to answering the questions. In one embodiment, the analyst may also present his/her credentials to the system using access control 106 to verify them. Upon verifying the credentials by the access control 106, a set of other documents (e.g., a subset of 140, 130 and 160 shown in FIG. 1) on which the analysis can be based may be identified. For example, the credentials define what document types the analyst can access, for instance, based on factors such as security classification, analyst position, the need to protect some sources, and others. The model may contain a formal specification of entities of interest, e.g. people, places, banks, and the like, and relations or associations, e.g. travel, time, money amounts transferred, and others. Some of these relations or associations can be asserted as truth, some can be specified as hypotheses.

Step 2 also may be performed by one or more analysts. At step 2, an analyst begins to create a report 204. During this step, an analyst may perform manual searches and operations such as specifying or entering entities and relations of interest. For instance, the analyst may search for factual data related to the entities of interest and their activities during the time period of interest. The analyst creates a report using the results obtained from the searches and any automatic text processing results obtained by using analytical tools and specifying entities and relations of interest. The report, for example, may contain the analyst's conclusion as to certain facts of interest obtained from the available information. To create a report, the analyst, for instance, may type or otherwise enter into the editor 105, or type into a template that may automatically populate more information based on the analyst's searches and extracted data. It is noted that the model 203 and report 204 can be small or even empty, as it may be revised in subsequent steps based on the automatically supplied evidence. The system and method of the present disclosure can work and provide reasonable and acceptable results with a minimal specification of questions, entities of interests and hypotheses.

As the analyst continues to evaluate the model 203 and write a report 204, the functional components of the system of the present disclosure in one embodiment (e.g., one or more of those shown in FIG. 1) perform automatic operations, for example, in the background as follows. At step 3, the system in one embodiment creates partially instantiated representation structure 205 that covers each sentence in the report 204. The representation structure 205 may also contain as metadata all or part of the model 203. A report, for instance, may contain information or text in natural language form such as English. The representation structure 205 is a formal version of the natural language, for example, specified in some variant of logic, a graph, or a computer data, or program or the like. An example of a representation structure 205 may be a semantic network. A semantic network represents semantic relations between the concepts. A semantic network may be a directed or undirected graph with vertices and edges. Vertices of the graph represent concepts. Edges represent relationships.

The plug-ins (FIG. 1 at 115), the QA system (FIG. 1 at 120), and optionally other parts of the system in FIG. 1 interoperate by taking the text of the report 204 and the model 203, passing them to QA system 120 and reasoning and representation model 150 respectively, and producing both a formal representation of the text (e.g., from reasoning and representation model 150) and a collection of facts with evidence (e.g., from the QA system 120). Reasoning and representation model 150 may utilize techniques in, e.g., discourse representation theory (DRT) to create the formal representation.

At step 4, the system (e.g., FIG. 1 at 100) may automatically create the evidence covering the sentences of the report 204 and their negation if required.

At step 5, the system (e.g., FIG. 1 at 100) automatically proposes a new model 207 based on evidence 206 to the analyst using, for example, the editor plug-ins (e.g., FIG. 1 at 115) and editor (e.g., FIG. 1 at 105).

At step 6, the analyst(s) may update or create a new report 208 and a new model 203A based on the proposed model 207. The analyst may start step 2 again using the new model 203A as an input to create the report 204. In this way, the sequence of steps 2 to step 6 may continue until the report is deemed satisfactory.

In one aspect, this mode of operation ensures that the model 207 and report 208 are thoroughly evaluated in an interactive fashion by executing steps 2 through 6 as many times as needed or desired. For example, the analyst can help the computer create a more formal representation, then the computer can automatically examine the supporting evidence in detail and the analyst assertions can be clearly marked as to whether they are supported by evidence. Further, the provenance of the supporting evidence can be well documented.

Figure 3:
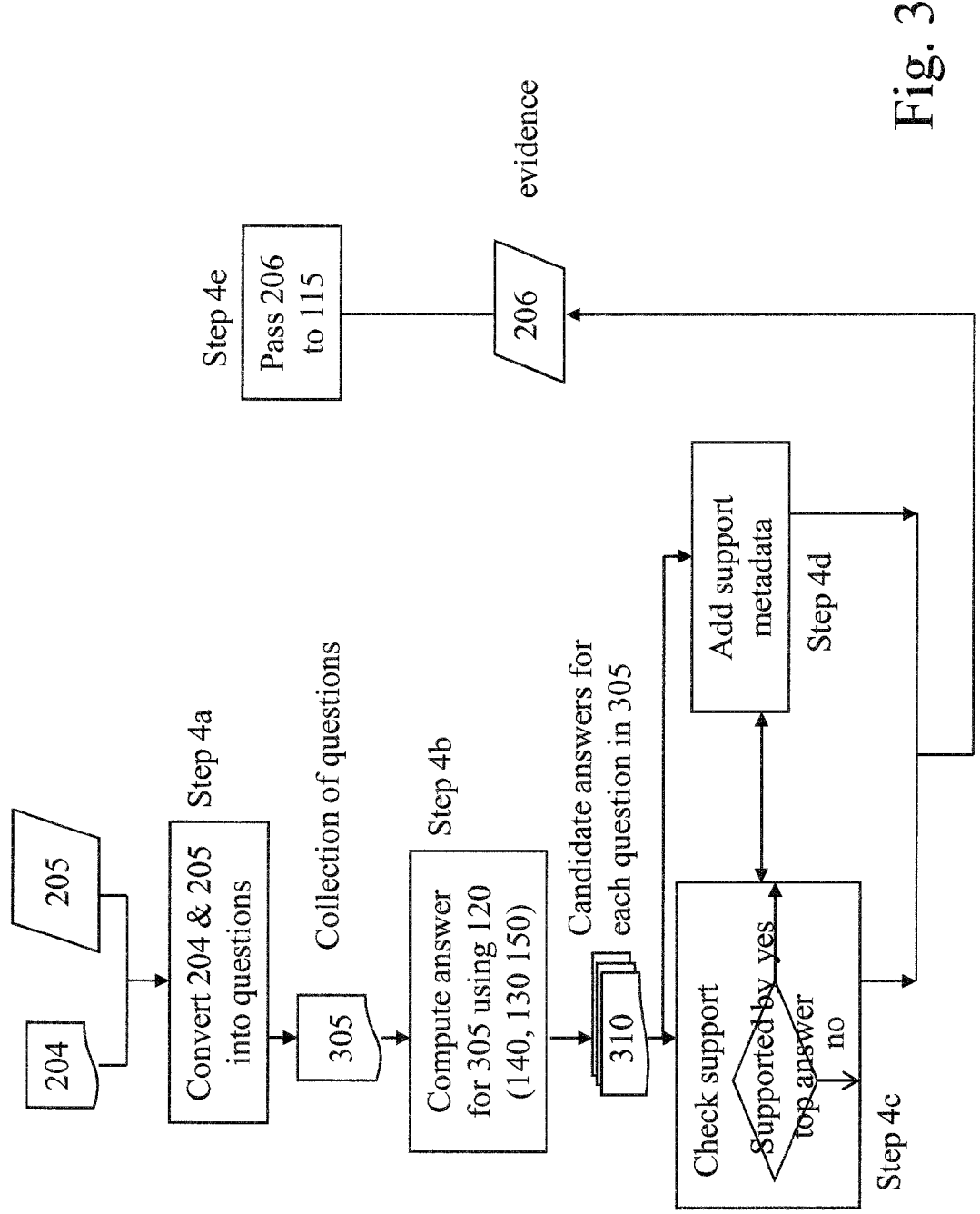
FIG. 3 illustrates details of evidence evaluation algorithm that leverages question answering.

FIG. 3 shows details of evidence evaluation algorithm that leverages question answering. In one embodiment, in the absence of other candidate answers the answer with some supporting evidence is deemed sufficient as an answer, and if there are other possible answers a deeper analysis may be performed. This presumably would allow the analyst to quickly sift through the evidence. Referring to FIG. 3, the system (e.g., FIG. 1) creates the evidence covering the sentences of the report 204 (and their negation, e.g., if the analyst(s) want to see evidence for and against all or some assertions). This may be done in the steps 4a-4e illustrated in FIG. 3. At step 4a each sentence of the report 204 and assertion in representation 205 is converted and treated as a collection of questions 305 that asks for example, who, where, when, what, by whom. For example, sentence "Attache Petrossian travelled from New York to Boston on Jul. 14, 2002" may become a collection of multiple queries posed as assertions "Attache X travelled from New York to Boston on Jul. 14, 2002", "Attache Petrossian travelled from X to Boston on Jul. 14, 2002", "Attache Petrossian travelled from New York to X on Jul. 14, 2002", "Attache Petrossian travelled from New York to Boston on X (date)". Such treatment may ensure evaluation of alternative factual hypotheses.

At step 4b, for each question in 305, the question answering system (FIG. 1, 120) and optionally document repository (FIG. 1, 140), reasoning and representation (FIG. 1, 150) and other data (FIG. 1, 130) are used to create a set of candidate answers 310. Referring to the above example collection of questions, the system, taking into account the context of the report and the first collection of documents, would attempt to instantiate X's in each of the above clauses using the question answering system. That is, the system is attempting to answer the underlying factual who/what/when and the like questions. Answer may include an entity and relation.

Similarly, background facts could be checked against open and privileged sources in the manner as described above. Background facts may be pieces of documents, or references thereto, that the analyst may have cut and pasted into the report. Open sources refer to sources that are freely accessible without privileges. Privileged sources refer to sources that require certain level of security or permission in order to access those sources.

At step 4c, for each sentence in the report 204 and assertion in the representation 205, the sentence is marked as being supported by evidence, using the candidate answers 310. For example, if the top ranked candidate answer(s) agree(s) with the assertions in the report 204 and representation 205, that assertion or a sentence representing that assertion or the like is marked as being supported; otherwise that assertion or a sentence representing that assertion or the like may be marked as unsupported. For example, metadata for the fact represented by the sentence may be created indicating that the sentence has weak support and the reasons, if any. Context may be taken into account, e.g., even if there are strong evidence for others traveling from A to B, if the person of interest in the report is not included in that part of the evidence, that person should not be included in the value of X, in answering "X traveled from A to B."

At step 4d, each sentence in the report 204 and the representation 205 is annotated with metadata describing the details of support. In addition, pointers to the support or lack of it can be stored in evidence 206 or the like, which allows examining provenance of report conclusions. Step 4d may be performed in parallel with operations in Step 4c. The support or lack thereof described in Steps 4*c* and 4*b* are not necessarily binary. Degree of support number can be generated using a statistical model.

At step 4*e*, evidence 206 is transmitted to the editor plug-in 115. Evidence may include, but is not limited to, a supporting passage, fact in a database, a partially matching graph, a result of a simulation.

The process described above need not involve computation of a logical form. That is, the reasoning and representation module (FIG. 1, 150) or representation 205 need not be used. For example, identifying named entity and basic relations suffice to extract the supporting evidence. Thus, any natural language chunker, for example, a tool that extracts relations between entities using linguistic information, may be employed by the QA module shown in FIG. 1 at 120. On the other hand, for the cases where such formal representation exists, for example, because of extraction patterns, the use of reasoning and representation module (FIG. 1, 150) or representation 205 may enhance the resulting accuracy.

The mode of operation of the disclosed system and method in one embodiment combines the search and analysis phase with the report writing phase in the research task. In the analysis phase the "fact checking" operation may be performed in the background. The disclosed system and method in one embodiment decompose and pose statements as a series of questions. A QA functional component or system of the present disclosure in one embodiment helps with the semantic analysis or evaluation in the writing process.

In another embodiment, the QA system (E.g., FIG. 1 at 120) may automatically investigate at all points a full set of alternative possibilities by asking for alternative to the proposed statements or sentences in the report. This ensures that alternative hypotheses receive equal treatment and a fair shake.

The system and method of the present disclosure in yet another embodiment may be capable of pointing to evidence or assumptions that have the greatest diagnostic value in judging the relative likelihood of the alternative hypotheses on the micro level of evaluating particular facts. Because analysts are engaged in the analysis they can provide such judgment on the macro level. The fact that key evidence may also be consistent with alternative hypotheses is considered explicitly, and not ignored.

The system and method of the present disclosure may further enable analysis of competing hypotheses by seeking evidence to refute hypotheses. The most probable hypothesis is deemed to be the one with the least evidence against it, not the one with the most evidence for it. At all points alternatives may be investigated.

Evidence evaluation can be further enhanced by leveraging or using a formal representation of discovered evidence and leveraging or using the subsystem/module 150. That is, formal hypothesis development can be performed using logic, dealing with contradictions, and the like, in addition to fact checking, and incorporate it back into the model and the report.

Other enhancements may be obtained by automatically following the type of evidence supporting or refuting report conclusions, for example, using streaming data. Analytical conclusions may be regarded as tentative. The situation may change, or it may remain unchanged while new information is received that may alter the appraisal. It may be helpful to specify in advance things one should look for or be alert to that, if observed, would suggest a significant change in the probabilities. For example, if there is only a time and route estimate of a person's trip, the system may look for incoming evidence that would make the route more precise (e.g. from analyzing video footage), where information such as person, location, time, may become part of metadata. The system may utilize components 160 shown in FIG. 1 to accomplish this task, and the rest of the system may utilize the information.

Another application of the disclosed technology would include integration with scripts describing suspicious behavior or patterns of interests. Similarly, the disclosed system and method may be integrated with standard analytical techniques such as Association Matrixes, Link Diagrams, Time Event Charts, Pattern Analysis Wheels.

In the system and method of the present disclosure, both data and computation (e.g computer processing) can be distributed, for instance, using cloud computing. The model or the like can be updated in realtime leveraging or using stream computing, for example, as in IBM™ Corporation's System S.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 4:
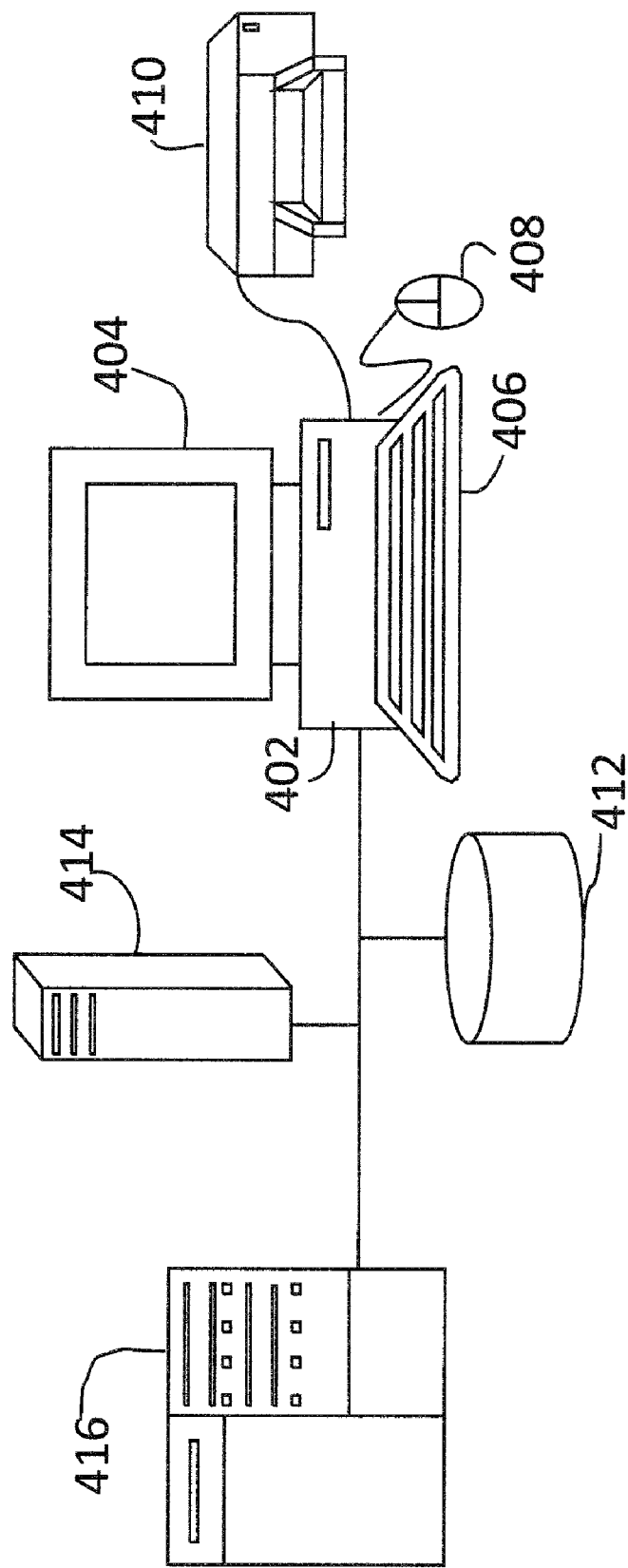
FIG. 4 illustrates an example of a computer system, in which the systems and methodologies of the present disclosure may be carried out or executed.

Referring now to FIG. 4, the systems and methodologies of the present disclosure may be carried out or executed in a computer system that includes a processing unit 402, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 404 for presenting output displays and providing a display through which the user may input data and interact with the processing system, for instance, in cooperation with input devices such as the keyboard 406 and mouse device 408 or pointing device. The computer processing system may be also connected or coupled to one or more peripheral devices such as the printer 410, scanner (not shown), speaker, and any other devices, directly or via remote connections. The computer processing system may be connected or coupled to one or more other processing systems such as a server 410, other remote computer processing system 414, network storage devices 412, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 402, 414, 416), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. An evidence evaluation method based on question answering, comprising:
   converting information into a collection of questions by a processor;
   determining answers to the collection of questions;
   marking a fact in the information as being supported if one or more of the answers to the collection of questions support the fact;
   marking a fact in the information as being refuted if one or more of the answers to the collection of questions refute the fact;
   collecting evidence that support the answers; and
   adding the evidence to a model of information to create an updated model of information.

2. The method of claim 1, wherein the information includes a report prepared from analyzing data.

3. The method of claim 1, wherein the information includes the model of information.

4. The method of claim 1, wherein the model of information includes structured data.

5. The method of claim 2, wherein the report includes natural language text.

6. The method of claim 1, wherein the step of marking a fact in the information as being supported further includes annotating the fact with metadata describing supporting answer for the fact.

7. The method claim 1, wherein the evidence include lack of support if one or more of the answers to the collection of questions refute the fact.

8. The method of claim 1, wherein an updated report is created by analyzing the updated model.

9. The method of claim 8, wherein the steps of converting, determining, marking, collecting and adding are repeated with the updated report.

10. The method of claim 1, wherein the steps of converting, determining, marking, collecting and adding are repeated with the updated model.

11. The method of claim 1, wherein the steps are performed as a background process as analysis is performed to create the information.

12. A system for an evidence evaluation method based on question answering, comprising:
   an editor operable to allow entering of information;
   an editor plug-in operable to automatically convert the information into a collection of questions;
   question answering processing module operable to determine answers for the collection of questions;
   said editor plug-in further operable to mark a fact in the information as being supported if one or more of the answers for the collection of questions support the fact and marking a fact in the information as being refuted if one or more of the answers for the collection of questions refute the fact, said editor plug-in further operable to collect the answers as evidence and add the evidence to the model of information to create an updated model of information.

13. The system of claim 12, wherein the information includes a report.

14. The system of claim 12, wherein the information includes a model of information, the model including structured data.

15. The system of claim 12, further including:
   reasoning and representation processing module operable to convert external data into structured data, wherein the question answering processing module uses the converted external data to determine answers to the collection of questions.

16. The system of claim 15, wherein the external data includes data from one or more of an information database, or Internet, or combinations thereof.

17. The system of claim 12, wherein the updated model of information is used to further as the information for forming a collection of questions.

18. A program storage device readable by a machine, tangibly embodying a program of instructions executable by the machine to perform an evidence evaluation method based on question answering, comprising:
   converting information into a collection of questions by a processor;
   determining answers to the collection of questions;
   marking a fact in the information as being supported if one or more of the answers to the collection of questions support the fact;
   marking a fact in the information as being refuted if one or more of the answers to the collection of questions refute the fact;
   collecting evidence that support the answers; and
   adding the evidence to a model of information to create an updated model of information.

19. The program storage device of claim 18, wherein the step of marking a fact in the information as being supported further includes annotating the fact with metadata describing supporting answer for the fact.

20. The program storage device claim 1, wherein the evidence includes lack of support if one or more of the answers to the collection of questions refute the fact.

* * * * *